US011599470B2

(12) United States Patent
Michelogiannakis et al.

(10) Patent No.: US 11,599,470 B2
(45) Date of Patent: Mar. 7, 2023

(54) LAST-LEVEL COLLECTIVE HARDWARE PREFETCHING

(71) Applicant: The Regents of the University of California, Oakland, CA (US)

(72) Inventors: Georgios Michelogiannakis, Berkeley, CA (US); John Shalf, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 17/295,797

(22) PCT Filed: Nov. 6, 2019

(86) PCT No.: PCT/US2019/060127
§ 371 (c)(1),
(2) Date: May 20, 2021

(87) PCT Pub. No.: WO2020/112320
PCT Pub. Date: Jun. 4, 2020

(65) Prior Publication Data
US 2022/0012178 A1   Jan. 13, 2022

Related U.S. Application Data (60) Provisional application No. 62/772,987, filed on Nov. 29, 2018.

(51) Int. Cl.
*G06F 12/08* (2016.01)
*G06F 12/0862* (2016.01)
(Continued)

(52) U.S. Cl.
CPC ...... *G06F 12/0862* (2013.01); *G06F 12/0811* (2013.01); *G06F 12/0835* (2013.01); *G06F 15/7825* (2013.01); *G06F 2212/6026* (2013.01)

(58) Field of Classification Search
CPC .......... G06F 12/0862; G06F 12/0811; G06F 12/0835; G06F 15/7825; G06F 2212/6026
(Continued)

(56) References Cited

U.S. PATENT DOCUMENTS 8,285,941 B2    10/2012   Navarro et al.
2011/0276786 A1*  11/2011   Eichenberger ...... G06F 9/30047
                                                           711/E12.001
(Continued)

OTHER PUBLICATIONS

International Search Report and Written Opinion dated May 26, 2020 for International Application No. PCT/US2019/060127.
(Continued)

*Primary Examiner* — Jae U Yu
(74) *Attorney, Agent, or Firm* — Womble Bond Dickinson (US) LLP (57) ABSTRACT

A last-level collective hardware prefetcher (LLCHP) is described. The LLCHP is to detect a first off-chip memory access request by a first processor core of a plurality of processor cores. The LLCHP is further to determine, based on the first off-chip memory access request, that first data associated with the first off-chip memory access request is associated with second data of a second processor core of the plurality of processor cores. The LLCHP is further to prefetch the first data and the second data based on the determination.

18 Claims, 9 Drawing Sheets

(51) Int. Cl.
*G06F 12/0811* (2016.01)
*G06F 12/0831* (2016.01)
*G06F 15/78* (2006.01)

(58) Field of Classification Search
USPC ........................................................ 711/154
See application file for complete search history.

(56) References Cited

U.S. PATENT DOCUMENTS

2012/0317364 A1    12/2012  Loh
2015/0154116 A1*    6/2015  Dittrich ............... G06F 12/0862
                                                      711/122
2018/0165204 A1     6/2018  Venkatesh et al.

OTHER PUBLICATIONS

Transmittal of International Preliminary Report on Patentability dated May 25, 2021, for International Application No. PCT/US2019/060127, filed Nov. 6, 2019, pp. 7.

Ahn, J.H., et al., "Future scaling of processor-memory interfaces," ser. SC, 2009.

Bhattacharjee, A., et al., "Shared last-level TLBs for chip multi-processors," ser. HPCA, 2011.

Byna, S. et al., "A taxonomy of data prefetching mechanisms," ser. I-SPAN, May 2008.

Flores, A. et al., "Energy-efficient hardware prefetching for CMPs using heterogeneous interconnects," ser. PDP, Feb. 2010.

Fu, J.W.C., et al., "Stride directed prefetching in scalar processors," ser. MICRO, 1992.

Kandemir, M., et al., "Adaptive prefetching for shared cache based chip multiprocessors," ser. DATE, 2009.

Lee, J. et al., "When prefetching works, when it doesn't, and why," ACM Trans. Archit. Code Optim.,vol. 9, No. 1, 2012.

Meng, J., et al., "Exploiting inter-thread temporal locality for chip multithreading," ser. IPDPS, Apr. 2010.

Michelogiannakis, G., et al., "Collective memory transfers for multicore chips," ser. ICS, 2014.

Nesbit, K.J., et al., "Data cache prefetching using a global history buffer," ser. HPCA, 2004.

Rixner, S., "Memory access scheduling," ser. ISCA, 2000.

Somogyi, S., et al., "Spatial memory streaming," ser. ISCA '06, 2006.

Jdipi, A.N., et al. "Rethinking DRAM design and organization for energy-constrained multi-cores," ser. ISCA, 2010.

Wang, D.T., "Memory DRAM memory systems: performance analysis and a high performance, power-constrained DRAM scheduling algorithm," Ph.D. dissertation, Univ. of MD, 2005.

Weinberg, J. et al., "Quantifying locality in the memory access patterns of HPC applications," ser. SC, 2005.

Michelogiannakis, G. et al., Inventors' presentation (Dec. 19, 2017 at 2017 IEEE 24th International Conference on High Performance Computing (HiPC)); PowerPoint; 16 pages.

Michelogiannakis, G., et al., Inventors' paper, "Last Level Collective Hardware Prefetching For Data-Parallel Applications," IEEE 24th Int'l. Conference on HiPC, 2017; 12 pages.

* cited by examiner

LAST-LEVEL COLLECTIVE HARDWARE PREFETCHING

REFERENCE TO RELATED APPLICATION

This application claims the benefit under 35 U.S.C. § 119(e) of U.S. Provisional Patent Application No. 62/772,987 filed on 29 Nov. 2018, the entire contents of which are hereby incorporated by reference herein.

STATEMENT OF GOVERNMENT SUPPORT

This invention was made with government support under Contract No. DE-AC02-05CH11231 awarded by the U.S. Department of Energy. The government has certain rights in this invention.

FIELD

The present invention relates to the field of computer processors, and particularly relates to last-level collective hardware prefetching.

BACKGROUND

Dynamic random-access memory (DRAM) performance and power are limiting factors for high-performance computing (HPC) system performance, especially in bulk-synchronous, data-parallel applications. Bulk-synchronous, data-parallel applications are useful in a variety of many-core processing contexts, including image processing, climate modeling, physics simulation, gaming, face recognition, etc.

Better performance and power may be achieved by prefetching. Prefetching is a technique for speeding up fetch operations of a processor by beginning a fetch operation whose result is expected to be needed in the short term. However, many approaches based on prefetching are unable to significantly increase performance and decrease power utilization in bulk-synchronous, data-parallel applications executed by many-core processing devices.

DETAILED DESCRIPTION

Last-level collective hardware prefetching for a many-core computer processor is described. In particular, in one embodiment, an approach to predict how different computation units in the same chip will access memory is described.

In one embodiment, it may be difficult to make predictions for what data each computation unit requires before it actually needs it, so as to prefetch the data and avoid stalling the computation unit. In one embodiment, memory performance constraints may be particularly limiting for bulk-synchronous data-parallel single program multiple data (SPMD) execution, in which all compute elements are employed in tandem to speed up a single kernel. The embodiments described herein provide memory system optimizations for bulk synchronous data-parallel SPMD execution for CMPs, which are at the core of a wide variety of diverse applications, from consumer-grade electronics to high performance computing (HPC). This family of workloads may include image processing, machine learning, physics simulation, climate modeling, and others.

Because of the amount of data processed, data-parallel applications may be particularly stressful to main memory. Many important applications today may be limited by memory bandwidth or latency. Even worse, emerging applications will be more sensitive to main memory bandwidth and latency than today. Because the performance of a memory-bound application is roughly proportional to the rate at which its memory requests are served, techniques to increase memory bandwidth may directly impact application execution time.

Data prefetching is one solution for latency hiding in modern CMPs. In one embodiment, hardware data prefetchers observe the memory access stream and predict what data should be moved closer to the cores before the data is actually requested by the cores. However, existing last-level cache (LLC) prefetchers on many-core architectures may be oblivious to the highly structured data access patterns that are inherent in SPMD execution, and so may be unable to effectively preserve memory address order across groups of cores. That is partly because existing LLC prefetchers typically operate in the physical address space and performing reverse translations for prefetching is prohibitively expensive. Therefore, prefetching from a different memory page than that of the request that initiated the prefetch is a major challenge. Low-level cache prefetchers do not have this opportunity because they do not get exposed to the access streams of other cores.

The embodiments described herein solve the above challenges, and others, by providing for a last-level collective hardware prefetcher (LLCP), which is an LLC prefetcher that recognizes and exploits the highly correlated access patterns of data-parallel algorithms and coarse-grain parallelization. LLCP extends the strided prefetcher to anticipate memory accesses by other cores that will request different parts of the same distributed array that the initiating core accesses first. The prefetches issued on behalf of different cores may reside in different physical memory pages, without the need for expensive address translations. Furthermore, LLCP issues prefetch requests to memory on behalf of multiple cores in memory address order, which maximizes bandwidth and reduces power. For applications without data-parallel access patterns, LLCP may revert to conventional strided prefetcher behavior. Essentially, LLCP acts as a memory access accelerator for the class of data-parallel applications and requires no software intervention.

The embodiments described herein provide additional improvements as well that relate to this methodology. For example, in one embodiment, the LLCHP may prefetch from larger portions of memory than previously capable because the embodiments avoid having to translate between types of memory addresses, unlike existing technologies. In addition, the LLCHP may be able to be configured in terms of how conservative it should be when making predictions to match the system and application.

The embodiments described herein provide techniques that may mitigate the effect that reduced memory performance has on computation in a variety of contexts. For example, the LLCHP may provide increased application performance, lower memory access energy, and faster memory access time (e.g., latency). The LLCHP accomplishes these and other improvements over existing technologies in part by determining if the type of application that is currently running is amenable to using one computation unit's access patterns to detect the access patterns of other computation units. When this is the case, it correlates access patterns together and is able to prefetch from larger memory regions than existing prefetchers. Previous prefetchers are generally oblivious to what computation unit created each memory access pattern, and thus do not correlate.

Figure 1:
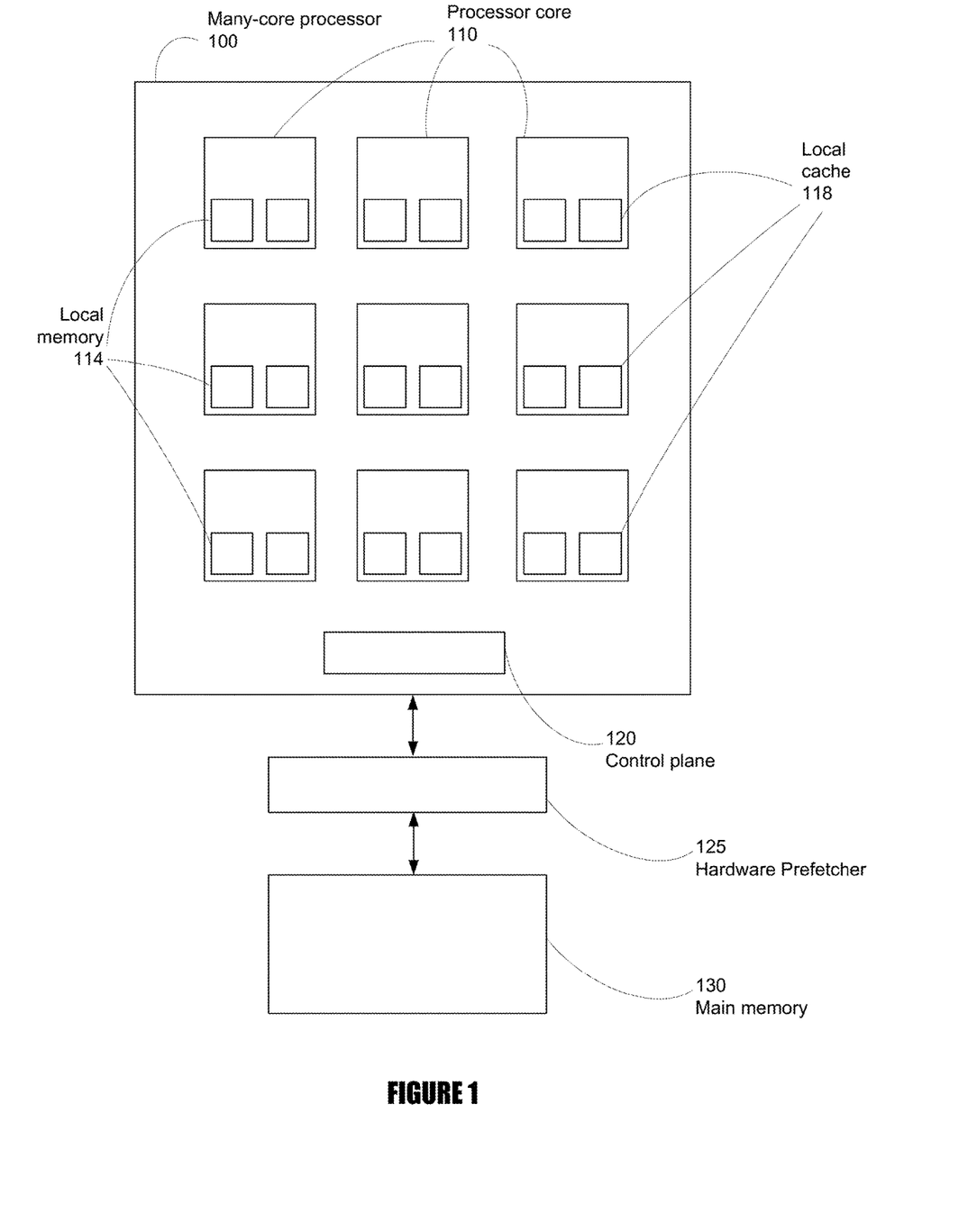
FIG. 1 is a system block diagram of an embodiment of a many-core processor.

FIG. 1 is a system block diagram of an embodiment of a many-core processor 100. The many-core processor 100 includes a plurality of processor cores 110 and is, therefore, a multi-core processor. In one embodiment, the processor cores 110 are central processing unit (CPU) cores. In one embodiment, the processor cores 110 are simple CPU cores. In one embodiment, the processor cores 110 are fully general purpose cores. In one embodiment, the processor cores 110 are designed to favor computational efficiency over serial (per-core) peak performance.

The processor cores 110 may include one or more processing devices, such as one or more central processing units (CPUs), microcontrollers, field programmable gate arrays or other types of processing devices. In one embodiment, the processor cores 110 are Tensilica LX2 cores which comprise in-order single-issue core+4-slot SIMD (Single Instruction, Multiple Data) FPU (floating-point unit) capable of 8 GFLOP/s (giga-floating point operations per sec) at 1 GHz (gigahertz) @ 40 mW (milliwatts).

The processor cores 110 may be interconnected via a Network-on-Chip (NoC) architecture. The NoC may connect the processor cores 100 to each other to enable inter-processor communication and memory addressing, and may also connect to off-chip services such as I/O (input/output) and memory controllers. In one embodiment, the processor cores 110 are connected to the NoC in a scalable "tiled" fashion so that each tile contains a processor core 110, its associated memory (or memories), and an associated portion of the NoC. This enables the number of processor cores 110 on chip to be scaled up flexibly. Each tile may include additional (or fewer) components. For example, in one embodiment, one or more tiles may not includes a memory or cache.

In one embodiment, the processor cores 110 are interconnected via one or more data buses. In one embodiment, the processor cores 110 are connected in a mesh or grid topology. In another embodiment, the processor cores 110 are connected in a torus or ring topology. The processor cores 110 may be interconnected using other topologies, architectures, design schemes, paradigms, or in other ways.

Each of the processor cores 110 includes a local memory 114 and a local cache 118. In one embodiment, the local memory 114 is software-controlled (e.g., software-managed) memory and the local cache 110 is automatically-controlled (e.g., automatically-managed). For example, in one embodiment, the software-controlled local memories 114 are used to explicitly manage locality when desired and the automatically-controlled local caches 110 are used for convenience for non-performance-critical data, and to help with incremental porting. Thus, the many-core processor 100 may provide the energy-efficiency benefits of software-controlled memory together with the ease-of-use of automatic-controlled caches. The many-core processor 100 may include mechanisms to maintain consistency between the local memories 114 and local caches 110.

In one embodiment, the local memory 114 is an L1 memory. In one embodiment, the local memory 114 is a scratch pad memory. In particular, in one embodiment, the local memory 114 is an L1 scratch pad memory. In one embodiment, each of the local memories 114 (or at least one or more of the local memories 114) is configured to be able to address any other local memory 114 (or at least one or more of the other local memories 114). In one embodiment, the local memories 114 are configured to address the other local memories 114 via an asynchronous direct memory access (DMA) mechanism that allows a data copy to be transmitted directly from one local memory 114 to another local memory 114. As noted above, in one embodiment, the local memory 114 is a scratch pad memory, thus the DMA mechanism allows direct scratchpad-to-scratchpad data copies. Each of the local memories 114 are located in different locations. Thus, each of the local memories 114 is a distance away from any other location, e.g. the location of a particular processor core 110. Different local memories 114 may be different distances from a particular processor core 110. For example, a local memory 114 of a first processor core may be 0 distance from the first processor core, whereas a local memory of a second processor core different from the first processor core may be X distance from the processor core, where X is greater than 0.

In one embodiment, the local cache 118 is an L1 cache. In one embodiment, the local caches 118 are coherent. In another embodiment, the local caches 118 are not coherent. In one embodiment, the local caches 118 are part of a coherence domain. Each local cache 118 (or at least one or more of the local caches 118) includes an instruction cache and a data cache. In one embodiment, the local caches 118 are configured to support incremental porting of existing code.

The many-core processor 100 may be coupled to a main memory 130 external to the many-core processor 130 or may include a main memory 130 internal to the many-core processor 130. In one embodiment, each of the local memories 114 (or at least one or more of the local memories 114) is configured to be able to address the main memory 130. In one embodiment, the local memories 114 are configured to address the main memory 130 via an asynchronous direct memory access (DMA) mechanism via an asynchronous direct memory access (DMA) mechanism that allows a data copy to be transmitted directly from the local memory 114 to the main memory 130.

Thus, in one embodiment, each of processor cores 110 (or at least one or more of the processor cores 110) is configured to be able to address any of local memories 114 (or at least one or more of the local memories 114 besides it own). In particular, each processor core 110 (or at least one or more of the processor codes 110) contains a local memory 114 configured to be visible in a global memory address space of the many-core processor 100 so that it is visible to all other processor cores 110 (or at least one or more of the other processor cores 110) of the many-core processor 100.

In one embodiment, each of the processor cores 110 (or at least one or more of the processor cores 110) is configured to be able to address the main memory 130. The main memory 10 may be addressed via the local cache 118 of the processor core 110.

The local memories 114, local caches 118, and main memory 130 may include any combination of volatile and/or non-volatile storage devices. They may also be one or more types of removable storage and/or one or more types of non-removable storage. They may include one or more of read-only memory (ROM), flash memory, dynamic random access memory (DRAM) such as synchronous DRAM (SDRAM) or static random access memory (SRAM).

The many-core processor 100 includes a control plane 120. In one embodiment, the control plane 120 is an independent control plane. In one embodiment, the control plane 120 is a separate/dedicated control plane 120. The control plane 120 may include direct message queues between the processor cores 110. The control plane 120 may be configured to perform synchronization in the many-core processor 100. The control plane 120 may be configured to enforce memory consistency between scratch pad memories. The use of a separate, independent control plane may improve scalability of the design and further improve energy efficiency.

In one embodiment, the control plate 120 is operatively coupled to hardware prefetcher 125, which in turn is operatively coupled to main memory 130. In one embodiment, hardware prefetcher 125 is the LLCHP described herein. In one embodiment, hardware prefetcher 125 determines if the type of application that is currently running on many-core processor 100 is amenable to using one computation unit's (e.g., processor core 110) access patterns to detect the access patterns of other computation units (e.g., other processor cores 110). When this is the case, hardware prefetcher 125 correlates access patterns together and is able to prefetch from larger memory regions than existing prefetchers. In one embodiment, hardware prefetcher 125 is included in many-core processor 100. In another embodiment, hardware prefetcher 125 is external to many-core processor 100.

In one embodiment, the processor cores 110 (including the local memories 114 and local caches 118) reside on a common carrier substrate, such as, for example, an integrated circuit ("IC") die substrate, a multi-chip module substrate, or the like. The main memory 130 may reside on the same common carrier substrate or a different substrate. The many-core processor 100 and main memory 130 reside on one or more printed circuit boards, such as, for example, a mother board, a daughter board or other type of circuit card.

Figure 2:
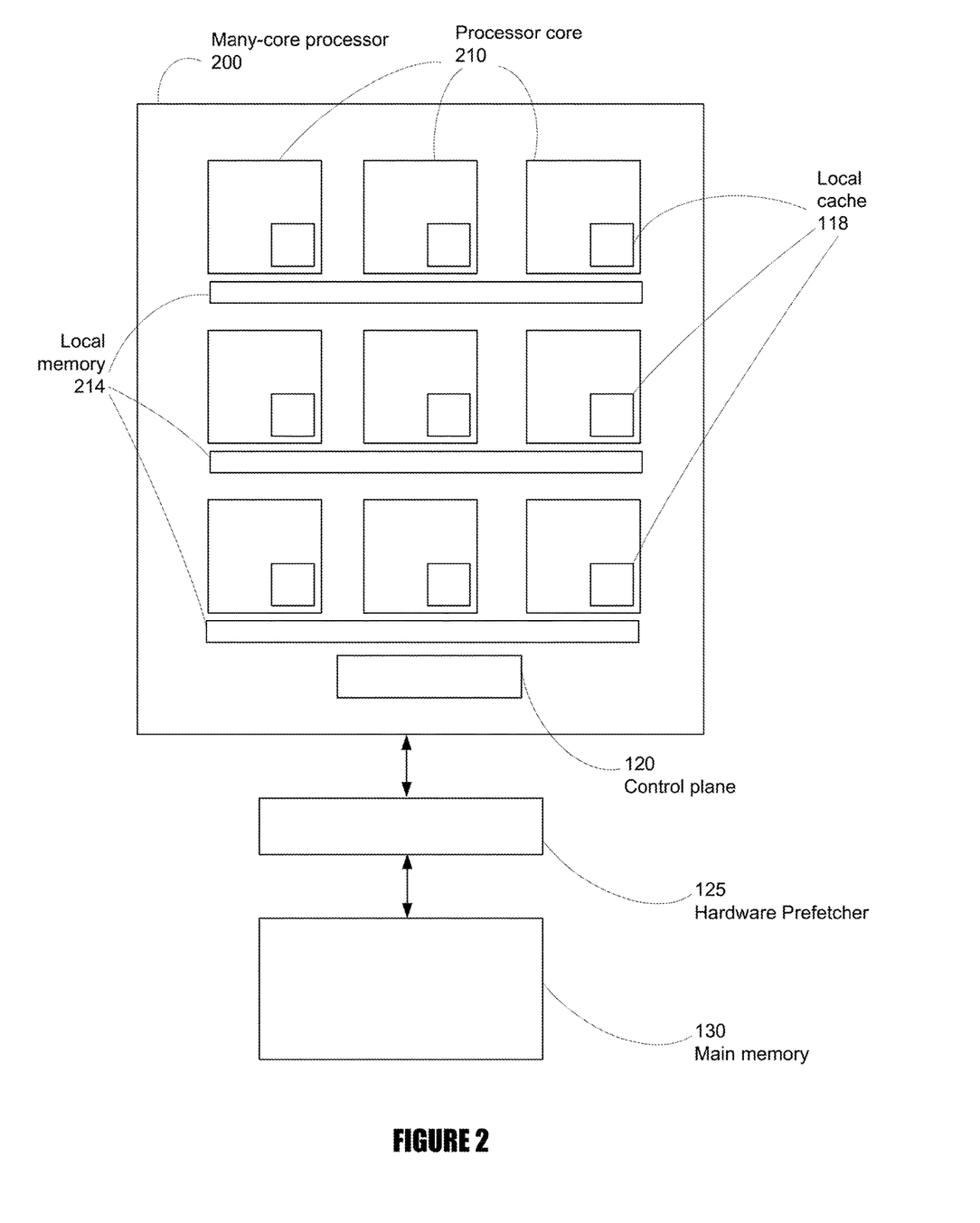
FIG. 2 is a system block diagram of another embodiment of a many-core processor.

FIG. 2 is a system block diagram of another embodiment of a many-core processor 200. The many-core processor 200 of FIG. 2 is substantially similar to the many-core processor 200 of FIG. 1 except that each of the processor cores 210 in FIG. 2 do not include a local memory 114 as the processor cores 110 in FIG. 1 do. Rather, the many-core processor 200 includes a plurality of local memories 214, each associated with a plurality of the processor cores 210. In one embodiment, each of the local memories 214 is an L2 memory.

As discussed with respect to FIG. 1, the control plate 120 may be operatively coupled to hardware prefetcher 125, which in turn is operatively coupled to main memory 130. In one embodiment, hardware prefetcher 125 is the LLCHP described herein. In one embodiment, hardware prefetcher 125 determines if the type of application that is currently running on many-core processor 200 is amenable to using one computation unit's (e.g., processor core 210) access patterns to detect the access patterns of other computation units (e.g., other processor cores 210). When this is the case, hardware prefetcher 125 correlates access patterns together and is able to prefetch from larger memory regions than existing prefetchers. In one embodiment, hardware prefetcher 125 is included in many-core processor 200. In another embodiment, hardware prefetcher 125 is external to many-core processor 200.

The embodiments of FIG. 1 and FIG. 2 could be combined to create a many-core processor in which some of the processor cores have dedicated L1 local memories and other processor cores are associated with L2 local memories. The embodiment of FIG. 1 and FIG. 2 could be combined to create a many-core processor in which some processor cores have dedicated L1 local memories and are associated with L2 local memories. The embodiments of FIG. 1 and FIG. 2 could be combined in other ways, including the addition of other levels of memory hierarchy. Both the embodiments of FIG. 1 and FIG. 2 include a plurality of local memories, each of the plurality of local memories being associated with a different set of at least one of the processor cores 110.

Figure 3A:
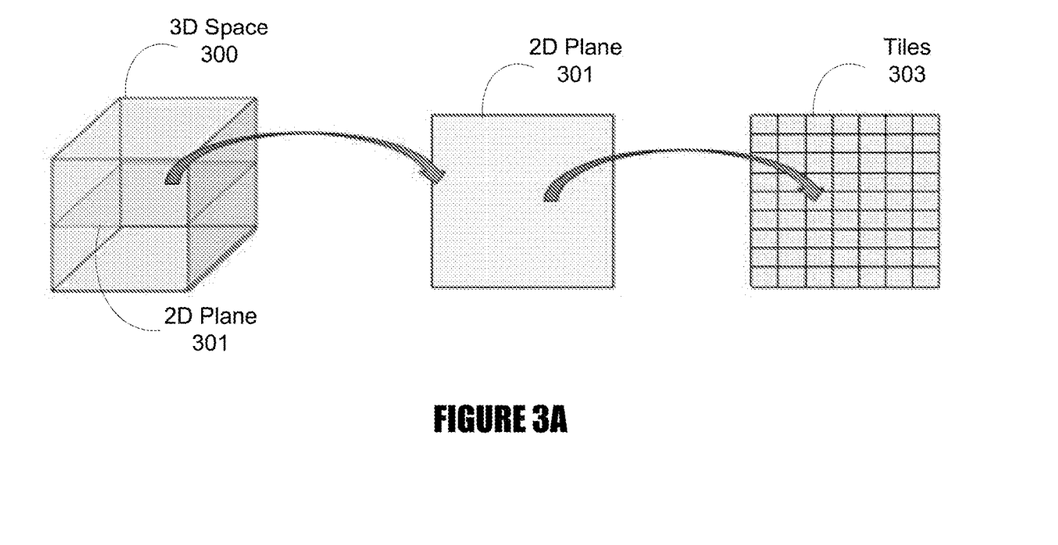
FIG. 3A is a system block diagram of a data array for data-parallel applications, according to one embodiment.

FIG. 3A is a system block diagram of a data array for data-parallel applications, according to one embodiment. In one embodiment, bulk-synchronous SPMD execution employs groups of cores executing essentially the same code in tandem with different inputs to speed up a single kernel. SPMD kernels may rely on domain decomposition to divide up a large work array. For example, referring to FIG. 3A, data to be executed on by a multitude of processing cores may exist in a 3D space 300. The data may be dividing into a plurality of 2D planes (e.g., 2D plane 301). In one embodiment, each 2D plane 301 may be too large to be operated on by a single processing core. In such a case, a 2D plan 301 may be divided further into data tiles 303. In one embodiment, each data tile 303 may be executed on by a single processor of the many-core processor. Each core computes on the data tiles (e.g., 303) it is assigned and then writes tiled results back to a contiguous array in main memory. Domain decomposition generalizes to problems of any dimension. In this setting, a core requesting a tile provides a strong indication that the other tiles in the same distributed array should be prefetched to on-chip caches, as described with respect to FIG. 3B.

Figure 3B:
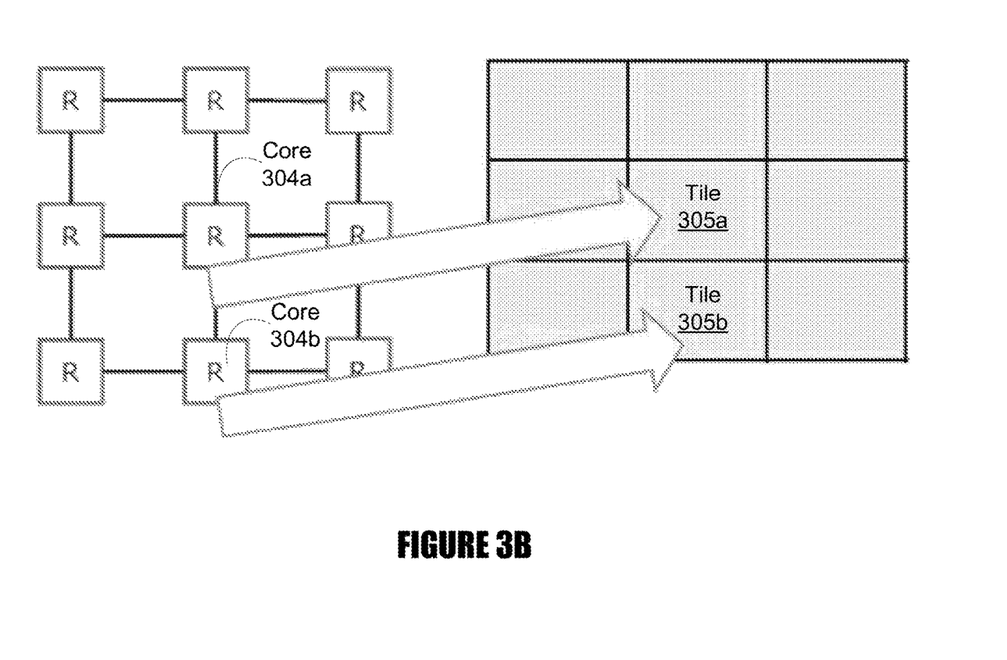
FIG. 3B is a block diagram of correlated access patterns, according to one embodiment.

FIG. 3B is a system block diagram of correlated access patterns, according to one embodiment. In one embodiment, when a first core 304a requests a first data file 305a, the LLCHP may prefetch data tile 305b, predicting that core 304b will request data tile 305b in the near future. In this way, a LLCHP may employ spatial locality as a prefetcher that is aware of data-parallel application access patterns. Even though there can be time skew between cores, because data-parallel applications use barriers between computation kernels, this skew may be is small enough such that prefetched data may not be evicted before they are used as long as the LLC can hold the working set for each core.

In one embodiment, CMPs cores (e.g., cores 304a, 304b, etc.) access memory independently—causing requests to arrive unordered to the DRAM controller (e.g., controller 120 of FIG. 1 and FIG. 2). Even though data-parallel applications may use barriers between computation kernels, there may be many loop iterations during computation phases. This may effectively eliminate any coordination among cores when they access the DRAM to load or write tiles. The skew in the data access patterns may be exacerbated by variability in core execution time caused by load imbalance, the system scheduler, and other factors.

In one embodiment, this generates non-contiguous access patterns to the memory. In general, non-contiguous access patterns may degrade DRAM bandwidth, latency, and power because they do not take advantage of preactivated rows and therefore cause more row activations compared to sequential access patterns (e.g., overfetch). Overfetch may be detrimental to memory throughput, latency, and power because activating a new row requires charging bit lines, amplification by sense amplifiers, and then writing bits back to cells. As a result, in many workloads an open row is used only once or twice before being closed due to a row conflict. In one embodiment, memory controllers may reorder requests in their transaction queues to reduce overfetching. However, they may be passive elements, which do not control how requests arrive to them. Therefore, their degree of choice may be limited to the entries in their finite-size transaction queues. In a medium- to large-scale CMP, where each core issues just a few tens of requests, this may be enough to overwhelm the existing DRAM controller's transaction queue. The LLCHP described herein overcomes these challenges, and others, by preserving memory address order across memory pages by making use of strided prefetcher operations.

In one embodiment, prefetchers in low-level caches move data closer to the cores (e.g., data cores 304a, 304b, etc.). LLC prefetchers move data from the DRAM to the LLC (e.g., off chip to on chip). In particular, low-level cache prefetchers may suffer on bulk-synchronous applications with dense block arrays because the contiguous address stream is typically short and may confuse filter heuristics of the prefetcher. In addition, low-level cache prefetchers may issue requests independently of others and thus create out-of-order access patterns to the memory, as discussed above. As discussed above, strided prefetcher operations may resolve these and other challenges. In one embodiment, each read request arriving to the prefetcher creates or accesses a stride prediction entry (SPE). When a load instruction requests address A, it may be compared to the previous address the same load requested (B). The difference A–B may be the new stride S for that instruction. When the request for A arrives, the SPE may be activated causing the prefetcher to issue A+i×S, where i ranges from 1 to D, where D is the degree, set by the prefetcher.

In one embodiment, strided prefetchers maintain an SPE for every load instruction and each core, and use the program counter (PC) or cache block addresses to differentiate between instructions. Each entry may contain a base address, the identifier of the core, the stride S, and the degree D. In addition, SPEs may carry a confidence value that has to be above a threshold (CONFTHRESH) for the SPE to produce prefetches. In one embodiment, confidence increases by CONFINC if, at the time the request for A arrives, the newly-calculated stride S matches the old stride (old value of S). Otherwise, confidence decreases by CONFDEC. In one embodiment, new SPEs may be assigned an initial confidence value CONFINIT. Confidence values may have a minimum MINCONF and a maximum MAXCONF.

In one embodiment, the strided prefetcher maintains its SPEs in the reference prediction table (RPT). The RPT may be indexed by a hash function that takes as input the load instruction's PC or cache block index. The RPT may be set-associative, such as to allow for multiple SPEs with the same hash function value. SPEs may be evicted when a new SPE is created using a replacement policy such as least recently used (LRU). Existing LLC prefetchers typically do not prioritize memory bandwidth and also do not accurately capture access patterns created by data-parallel applications. In part, this is because LLC prefetchers may operate in the physical address space. Thus, spanning memory pages in a single prefetch activation may require a reverse translation to the virtual address space, which may make such approaches impractical. The embodiments described herein exploit the correlated behavior of cores that are executing SPMD code.

Figure 4A:
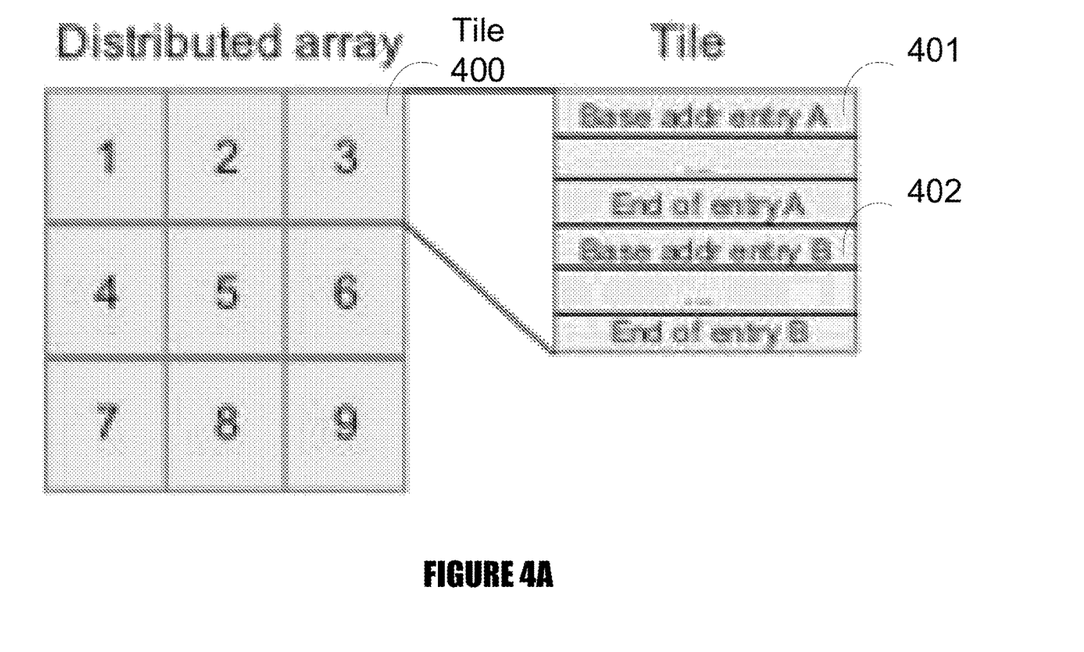
FIG. 4A is a block diagram illustrating a two-stride-prediction-entry tile prefetch, according to one embodiment.

FIG. 4A is a system block diagram illustrating a two-stride-prediction-entry tile prefetch, according to one embodiment. As illustrated in FIG. 4, tiles (e.g., tile 3 400) may be much larger than SPE degrees (D). In such a case, it may be impractical to set D large enough to fetch the entire tile 3 400 at once because this may create LLC contention. Therefore, SPEs may be activated from multiple memory requests at different times to prefetch the entire tile 3 400 (e.g., base address entry A 401 and base address entry B 402). Also, the majority of modern mappings of tiles to memory addresses may not preserve contiguous memory address order of data. Because tiles may not consist of contiguous address spaces, the request stream generated by prefetchers that only prefetch within a single core's tile may not be in contiguous address order. In addition, tiles may be much larger than memory pages (e.g., 4 KB). Given that LLC prefetchers predominantly operate in the physical address space, an LLC prefetcher attempting to prefetch an entire tile may require multiple translations between the virtual and physical address spaces. This may be unfavorably costly, even if a last-level translation lookaside buffer (TLB) is available. Therefore, prefetchers may tend to stop prefetching at page boundaries, which may limit prefetching effectiveness.

Figure 4B:
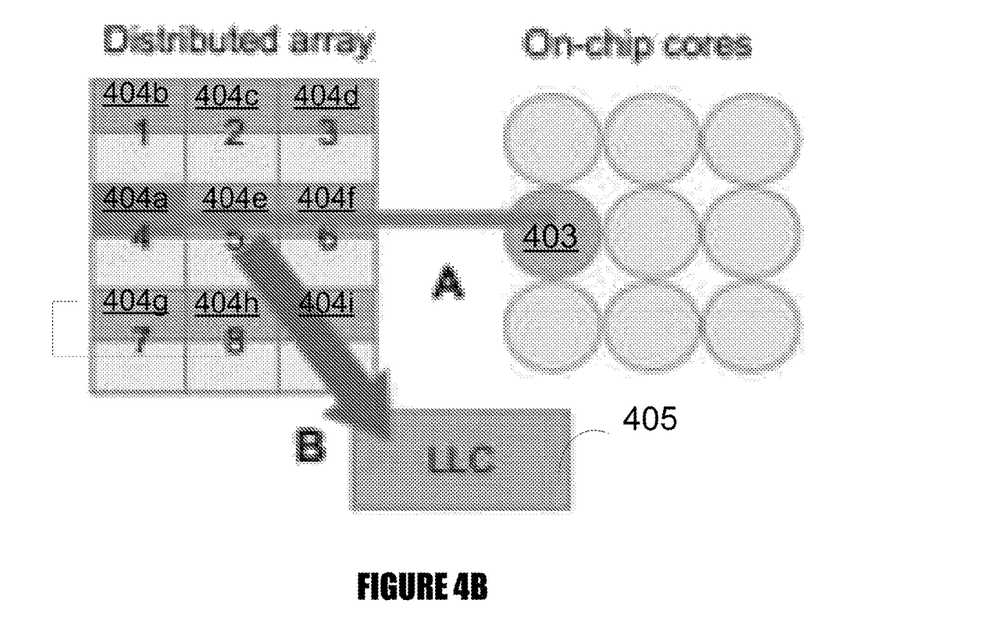
FIG. 4B is a block diagram illustrating LLCHP functionality, according to one embodiment.

FIG. 4B is a block diagram illustrating LLCHP functionality, according to one embodiment. In one embodiment, when a core 403 requests a corresponding tile 404, part of, or the entire tile 404a, may be prefetched. LLCP may also prefetch the equivalent parts (e.g., 404b-i) of other tiles into the LLC 405 if the application generates data-parallel memory access patterns. In one embodiment, LLCP fetches each tile from the memory page it resides in, which may differ from the memory page the triggering request is in. Next, all data across cores may be fetched in memory address order to maximize memory bandwidth.

In one embodiment, to produce a prefetch stream in address order, LLCP may maintain all SPEs associated with the same distributed array sorted by base address in the physical space. Therefore, in the example of FIG. 4A, there is one SPE per tile and SPEs are associated to each other and sorted by base address. When a prefetch for a distributed array initiates, SPEs may be used in an interleaved manner. If Basei is the base address of the ith SPE in memory address order, Si its stride, Di its degree, and N (the number of SPEs associated with the same distributed array), the generated access stream is:

$$\text{Base}_1, \ldots, \text{Base}_N, \ldots, (\text{Base}_1+S_1), \ldots, (\text{Base}_N+S_N), \ldots, (\text{Base}_1+S_1 \times D_1), \ldots, (\text{Base}_N+S_N \times D_N) \quad (1)$$

In one embodiment, the above example assumes that all $S_i$ are equal. In bulk-synchronous SPMD execution, it may be the same instructions (with the same PC) but from different cores that access different parts of the same distributed array/Therefore, SPEs with the same PC value may be associated and may generate prefetches (activate) when one SPE with that PC activates. In one embodiment, SPEs with the same PC and confidence no less than CONF- THRESH may belong to a group. For example, in FIG. 4A, SPEs for tiles 1 through 9 belong to the same group. SPEs may join or create a group when their confidence is increased to no less than CONFTHRESH. They may be evicted when they are evicted from the RPT or their confidence falls below CONFTHRESH. SPEs may update their confidence in a similar manner to that used by a strided prefetcher. Advantageously, by forming groups in this manner the LLCP detects and exploits data-parallel access patterns.

Figure 5:
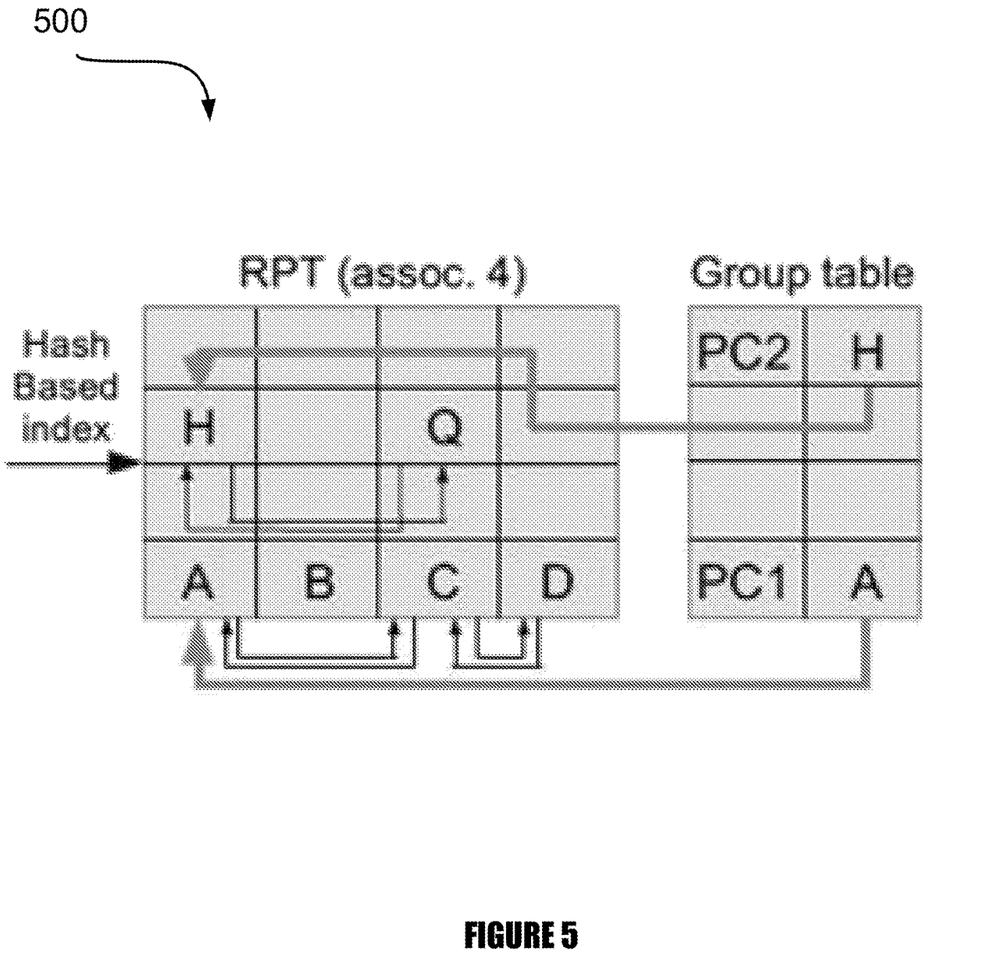
FIG. 5 is a block diagram illustrating LLCHP architecture, according to one embodiment.

FIG. 5 is a block diagram illustrating LLCHP architecture 500, according to one embodiment. In one embodiment, SPEs contain a base address, core identifier, radix (R), degree (D) and confidence. When a memory request arrives to the prefetcher, the hash function is used to index the RPT. The RPT returns a an SPE that was created by the same core as the incoming request. SPEs in the same group are not constrained to belong to the same RPT set (line), if allowed by the hash function. In one embodiment, the hash function may be:

$$\left(\frac{PC_{request} \% \ NumLines_{RPT}}{4} + Core_{ID}\right) \% 4$$

With this hash function, all SPEs with the same PC value have to be in one of four RPT lines (hence the modulo four in the hash function) such that the associativity of the RPT can be four times less than the maximum group size. Otherwise, groups of maximum size may not be formed because SPEs of the group will continue to evict other SPEs of the same group in the RPT. In other embodiments, any number of other RPT lines may be used.

Figure 6:
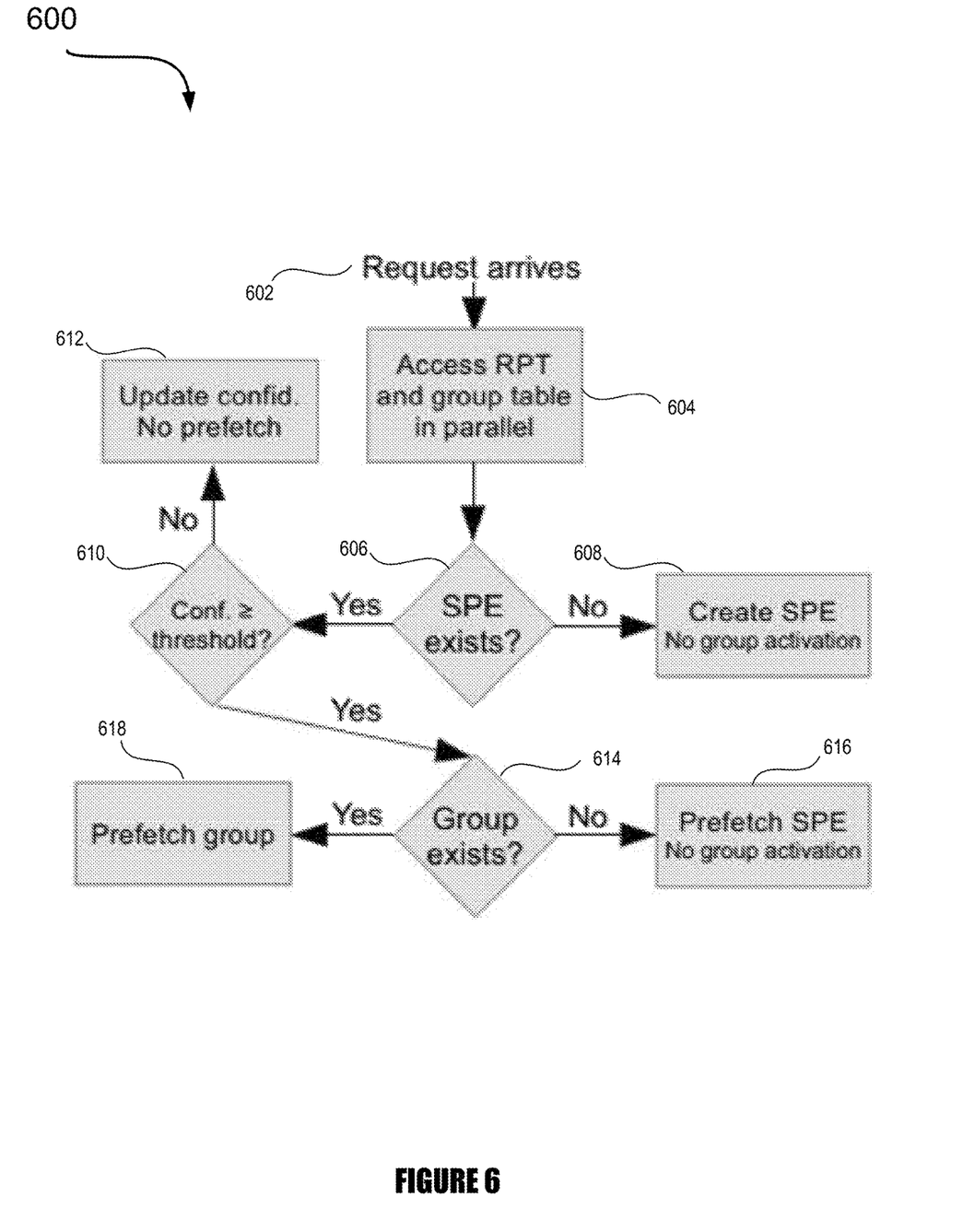
FIG. 6 is a flow diagram illustrating LLCHP operations, according to one embodiment.

FIG. 6 is a flow diagram 600 illustrating LLCHP operations, according to one embodiment. In certain embodiments, the operations of flow diagram 600 may be performed by processing logic that may include hardware such as one or more computer processing devices, software (e.g., instructions running/executing on a computer processing device), firmware (e.g., microcode), or a combination thereof. In one embodiment, the operations of flow diagram 600 may be performed by hardware prefetcher (e.g., LLCHP) 125 of FIG. 1 and FIG. 2, for example.

In one embodiment, when a memory request arrives to the prefetcher 602, the RPT and the group table are accessed in parallel 604. If an existing SPE with the incoming request's core and PC values does not exist in the RPT at block 606, the prefetcher behaves as a strided prefetcher by creating 608 a new SPE with the initial confidence (CONFINIT) and the request's address as base. In one embodiment, this may mean finding a free location in the set dictated by the indexing hash function, and potentially finding an eviction candidate. If an SPE is found in the RPT at block 606 but the confidence level is below the confidence threshold CONTHRESH at block 610, the confidence level is updated and no prefetch is performed at block 612. If the confidence equal to or above the confidence threshold CONTHRESH at block 610, but a group with the request's PC does not exist (the group table contains no such entry) at block 614, LLCP uses the SPE from the RPT in the same manner as the strided prefetcher to issue prefetches (block 616). Therefore, in applications that do not exhibit data-parallel memory access patterns, LLCP may operate similarly to the strided prefetcher because no groups are formed. Even if a group activates, the confidence, base address and stride S of the SPE retrieved from the RPT may be updated similarly to the strided prefetcher. If a group does exist at block 614, that group may be used to generate prefetches at block 618. Confidence values of other SPEs in the group may not be updated. In one embodiment, if the group exists at block 614, the prefetcher issues one prefetch per SPE in an interleaved manner by base address order. As described herein, SPEs in groups may be kept in a double-linked list by base address order.

Figure 7:
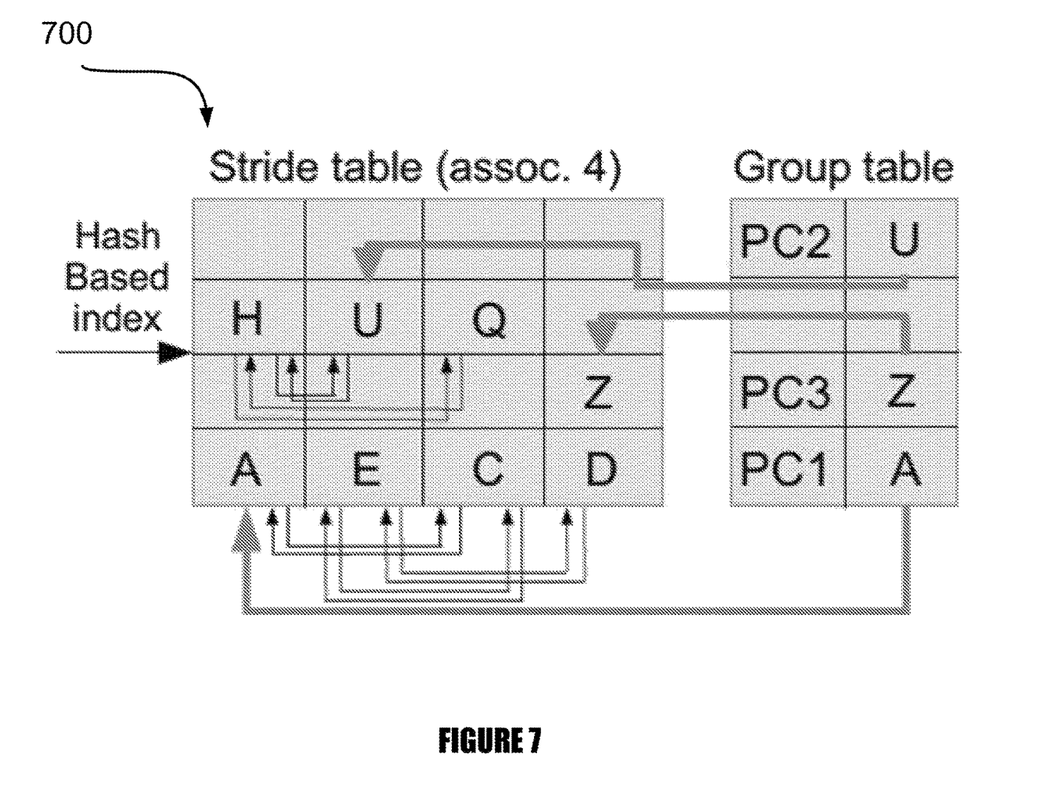
FIG. 7 is a block diagram illustrating LLCHP architecture, according to one embodiment.

FIG. 7 is a block diagram illustrating LLCHP architecture 700, according to one embodiment. As illustrated in FIG. 7, base address order sequence is "A", "C", "E", "D" for the corresponding group. Therefore, the linked list may be accessed starting from the lowest base address SPE found in the group table (e.g., "A" in the example), and then uses the list's pointers to find the next SPE in sequence until all SPEs are accessed. Once all SPEs in the group generate one prefetch request, the traversal repeats for a total number of D linked list sweeps.

Therefore, the prefetch stream is that of Equation 1 for N SPEs in the group. Because groups are ordered by base address, this results in a prefetch request stream ordered by memory address. This implies that D and S are the same for all SPEs in the group, which is true for mappings that map tiles to memory the same way for all tiles. In one embodiment, SPE base addresses may update when the same instruction (e.g., same PC) from the same core that created them issues a subsequent request, similar to the strided prefetcher. In another embodiment, when an SPE activates as part of a group, it may still contain an old base address. In FIG. 4B, the first core that requests the bottom half of its tile (or an entirely new distribute array), will activate all other SPEs of the same group for other tiles. To prevent having all other SPEs fetch the top half of their tile again using their old base address, LLCP may calculate the difference between the address of the new memory request that is triggering the prefetch and the base address of the SPE with the same PC and core identifier, found in the RPT. This difference (e.g., adjustment factor) may be applied to all prefetches by SPEs in the same group. In the example of FIG. 4B, this means that the first request that arrives for the bottom part of a tile, activates all SPEs in the group but for the bottom part of their corresponding tiles, by adding the adjustment factor to the base address of SPEs in the group.

In one embodiment, to prevent fetching the bottom half of tiles again when another SPE in the group activates due to its own core's memory requests, each SPE may be extended to record the base address (adjusted by the adjustment factor) the last time it activated. If an SPE would activate again with the same base address and adjustment factor, it is skipped instead. In some embodiments, if a single SPE would cross page boundaries, any further prefetches are suppressed. This determination is done for each SPE individually and does not affect other SPEs in the group. Advantageously, because a group can contain multiple SPEs and each SPE can point to a different memory page, a single group activation can fetch from each memory page that SPEs in the group have their base addresses set to. Advantageously, this means the LLCP may prefetch from multiple memory pages from a single prefetch, without address translation.

Figure 8:
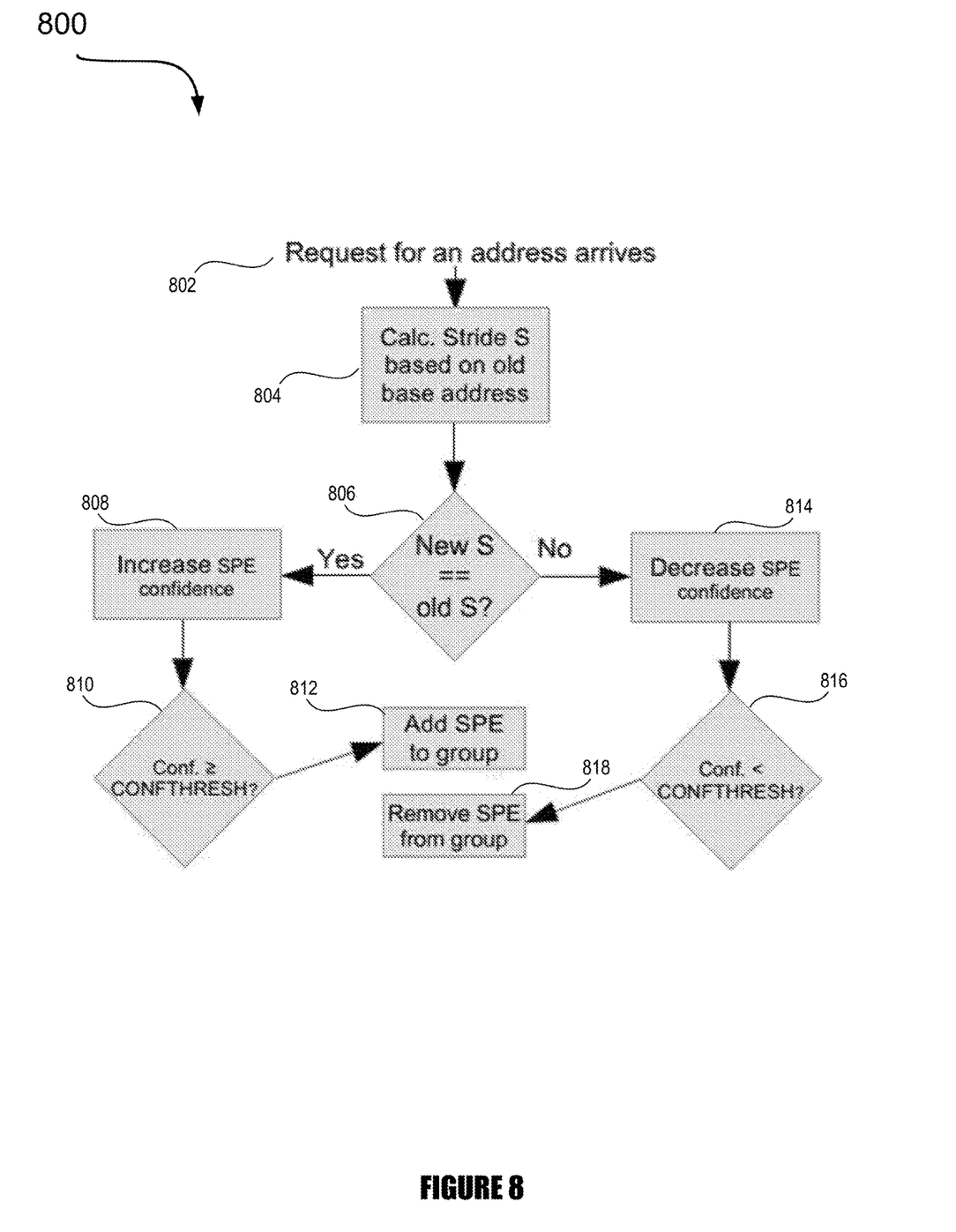
FIG. 8 is a flow diagram illustrating adding or removing an SPE from a collective group based on confidence updates, according to one embodiment.

FIG. 8 is a flow diagram 800 illustrating adding or removing an SPE from a collective group based on confidence updates, according to one embodiment. In certain embodiments, the operations of flow diagram 800 may be performed by processing logic that may include hardware such as one or more computer processing devices, software (e.g., instructions running/executing on a computer processing device), firmware (e.g., microcode), or a combination thereof. In one embodiment, the operations of flow diagram 800 may be performed by hardware prefetcher (e.g., LLCHP) 125 of FIG. 1 and FIG. 2, for example.

In one embodiment, an SPE joins or creates a collective group when its confidence reaches CONFTHRESH. This may happen during SPE creation if CONFINIT is no less than CONFTHRESH, or at the time memory accesses arrive (block 802) and are used to update SPE confidence values in the RPT.

In one embodiment, for an SPE to leave a group, the LLCP (e.g., hardware prefetcher 125 of FIG. 1 and FIG. 2) performs a lookup in the group table (block 806) after calculating stride S based on the old base address (block 804). If an entry with the same PC is not found (block 806), the confidence value may be decreased (block 814). In one embodiment, if the SPE's confidence value falls below CONFTHRESH (block 816) or when they are evicted from the RPT by the RPT's replacement policy, SPEs leave a collective group (block 818). An SPE with both of its pointers set to null may not belong to a collective group. This process is illustrated in flow diagram 800, for example.

In one embodiment, for an SPE to join a group, the LLCP (e.g., hardware prefetcher 125 of FIG. 1 and FIG. 2) performs a lookup in the group table (block 806) after calculating stride S based on the old base address (block 804). If an entry with the same PC is found, the confidence value may be increased (block 808). If the new confidence value is greater than or equal to CONFTHRESH (block 810), the SPE joins that group (block 812). In that case, the SPE traverses the linked list of the group to find the existing SPE with the largest base address that is still smaller that the newly joining SPE's base address (e.g., the largest smaller value). It then manipulates the pointers appropriately to insert the newly-joining SPE at that location. Advantageously, this serves to keep the group sorted by base address. If an entry with the same PC is not found at block 806 but a free slot in the group table exists, the SPE creates an entry, essentially starting a new group. Examples are shown with respect to FIG. 7.

In one embodiment, if a newly-created SPE does not find a group with the same PC and no free entry exists in the group table, it looks for group entries with only one SPE (e.g., marked with a flag in the group table). Among them, it replaces the LRU group entry because the oldest group that still contains a single SPE is less likely to get new SPEs in the future. Inactive or imprecise groups may be disbanded by low confidence or RPT evictions. SPEs that do not find space to form a group may retry when they are activated next.

Figure 9:
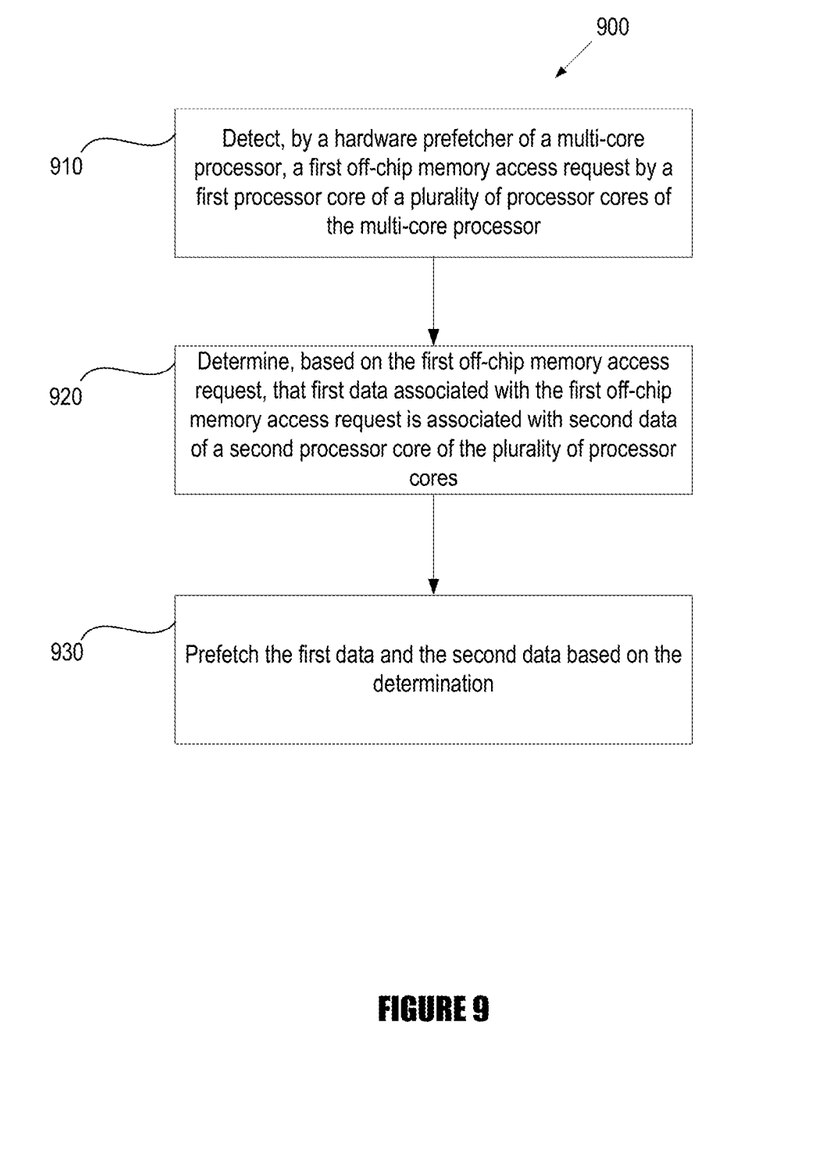
FIG. 9 is a flow diagram illustrating an LLCHP process flow, according to one embodiment.

FIG. 9 is a flow diagram 900 illustrating an LLCHP process flow, according to one embodiment. In certain embodiments, the operations of flow diagram 900 may be performed by processing logic that may include hardware such as one or more computer processing devices, software (e.g., instructions running/executing on a computer processing device), firmware (e.g., microcode), or a combination thereof. In one embodiment, the operations of flow diagram 900 may be performed by hardware prefetcher (e.g., LLCHP) 125 of FIG. 1 and FIG. 2, for example.

Beginning at block 910, a LLCHP of a multi-core processor may detect a first off-chip memory access request by a first processor core of a plurality of processor cores of the multi-core processor. At block 920, the LLCHP may determine, based on the first off-chip memory access request, that first data associated with the first off-chip memory access request is associated with second data of a second processor core of the plurality of processor cores. In one embodiment, determining that the first data associated with the first off-chip memory access request is associated with the second data of the second processor core of the plurality of processor cores includes determining that a stride entry exists for the first off-chip memory access request and determining that a group exists for the stride entry. In another embodiment, to determine the association, LLCHP may further determine that a confidence threshold, corresponding to a confidence level that the first data is associated with the second data, is greater than or equal to a threshold level.

At block 930, LLCHP may prefetch the first data and the second data based on the determination that first data associated with the first off-chip memory access request is associated with second data of a second processor core of the plurality of processor cores. In one embodiment, prefetching the first data and the second data may include storing the first data and the second data in a last-level cache (e.g., a DRAM) of the multi-core processor. In one embodiment, prefetching the first data and the second data based on the determination may include prefetching the entire group associated with the stride entry.

In other embodiments, LLCHP may determine that there is no association between data of different processor cores. For example, in one embodiment, LLCHP may further detect a second off-chip memory access request by the first processor core, determine (e.g., based on the second off-chip memory access request) that third data associated with the second off-chip memory access request is not associated with any additional data of the second processor core, and prefetching only the third data based on the determination. In one embodiment, determining that the third data associated with the second memory access request is not associated with the any additional data of the second processor core may include determining that a stride entry does not exist for the memory access request and generating the stride entry.

To determine that the third data associated with the second memory access request is not associated with the any additional data of the second processor core, LLCHP may determine that a group does not exist for the stride entry. Furthermore, to determine that the third data associated with the second off-chip memory access request is not associated with the any additional data of the second processor core, the LLCHP may determine that a confidence threshold, corresponding to a confidence level that the third data is associated with the any additional data, is less than a threshold level. In such a case, LLCHP may update the confidence threshold based on the determining that the confidence threshold is less than the threshold level.

Advantageously, by performing the LLCHP operations described with respect to FIG. 9, as well as those described with respect to FIGS. 1-8, processor and memory performance in modern-day computing systems may be significantly increased. For example, the LLCHP described herein may provide better application performance, lower memory access energy, and faster memory access time (e.g., latency). Furthermore, the LLCHP may prefetch from larger portions of memory than previously capable because the described embodiments avoid having to translate between types of memory addresses.

What is claimed is:
1. A multi-core computer processor comprising:
a plurality of processor cores interconnected in a Network-on-Chip (NoC) architecture; and a hardware prefetcher operatively coupled to the plurality of processor cores and to a cache, wherein the hardware prefetcher is to:
  detect a first off-chip memory access request by a first processor core of the plurality of processor cores;
  determine, based on the first off-chip memory access request, that first data associated with the first off-chip memory access request is associated with second data of a second processor core of the plurality of processor cores; and
  prefetch the first data and the second data based on the determination,
  wherein to determine that the first data associated with the first off-chip memory access request is associated with the second data of the second processor core of the plurality of processor cores, the hardware prefetcher is to:
  determine that a stride entry exists for the first off-chip memory access request; and
  determine that a group exists for the stride entry.

2. The multi-core computer processor of claim 1, further comprising a last-level cache operatively coupled to the plurality of processor cores and to the hardware prefetcher, wherein to prefetch the first data and the second data the hardware prefetcher is to store the first data and the second data in the last-level cache.

3. The multi-core computer processor of claim 1, wherein to determine that the first data associated with the first off-chip memory access request is associated with the second data of the second processor core of the plurality of processor cores, the hardware prefetcher is further to determine that a confidence threshold, corresponding to a confidence level that the first data is associated with the second data, is greater than or equal to a threshold level.

4. The multi-core computer processor of claim 1, wherein to prefetch the first data and the second data based on the determination, the hardware prefetcher is further to prefetch the entire group associated with the stride entry.

5. A multi-core computer processor comprising:
  a plurality of processor cores interconnected in a Network-on-Chip (NoC) architecture; and
  a hardware prefetcher operatively coupled to the plurality of processor cores and to a cache, wherein the hardware prefetcher is to:
    detect a first off-chip memory access request by a first processor core of the plurality of processor cores;
    determine, based on the first off-chip memory access request, that first data associated with the first off-chip memory access request is associated with second data of a second processor core of the plurality of processor cores;
    prefetch the first data and the second data based on the determination;
    detect a second off-chip memory access request by the first processor core;
    determine, based on the second off-chip memory access request, that third data associated with the second off-chip memory access request is not associated with any additional data of the second processor core; and
    prefetch only the third data based on the determination.

6. The multi-core computer processor of claim 5, wherein to determine that the third data associated with the second memory access request is not associated with the any additional data of the second processor core, the hardware prefetcher is to:
  determine that a stride entry does not exist for the memory access request; and
  generate the stride entry.

7. The multi-core computer processor of claim 6, wherein to determine that the third data associated with the second memory access request is not associated with the any additional data of the second processor core, the hardware prefetcher is to determine that a group does not exist for the stride entry.

8. The multi-core computer processor of claim 5, wherein to determine that the third data associated with the second off-chip memory access request is not associated with the any additional data of the second processor core, the hardware prefetcher is further to determine that a confidence threshold, corresponding to a confidence level that the third data is associated with the any additional data, is less than a threshold level.

9. The multi-core computer processor of claim 8, wherein the hardware prefetcher is further to update the confidence threshold based on the determining that the confidence threshold is less than the threshold level.

10. A method of prefetching data in a multi-core computer processor, the method comprising:
  detecting, by a hardware prefetcher of the multi-core processor, a first off-chip memory access request by a first processor core of a plurality of processor cores of the multi-core processor;
  determining, based on the first off-chip memory access request, that first data associated with the first off-chip memory access request is associated with second data of a second processor core of the plurality of processor cores; and
  prefetching the first data and the second data based on the determination,
  wherein determining that the first data associated with the first off-chip memory access request is associated with the second data of the second processor core of the plurality of processor cores comprises:
  determining that a stride entry exists for the first off-chip memory access request; and
  determining that a group exists for the stride entry.

11. The method of claim 10, wherein prefetching the first data and the second data comprises storing the first data and the second data in a last-level cache of the multi-core processor.

12. The method of claim 10, wherein determining that the first data associated with the first off-chip memory access request is associated with the second data of the second processor core of the plurality of processor cores comprises determining that a confidence threshold, corresponding to a confidence level that the first data is associated with the second data, is greater than or equal to a threshold level.

13. The method of claim 10, wherein prefetching the first data and the second data based on the determination comprises prefetching the entire group associated with the stride entry.

14. A method of prefetching data in a multi-core computer processor, the method comprising:
  detecting, by a hardware prefetcher of the multi-core processor, a first off-chip memory access request by a first processor core of a plurality of processor cores of the multi-core processor;
  determining, based on the first off-chip memory access request, that first data associated with the first off-chip memory access request is associated with second data of a second processor core of the plurality of processor cores;
  prefetching the first data and the second data based on the determination;

detecting a second off-chip memory access request by the first processor core;

determining, based on the second off-chip memory access request, that third data associated with the second off-chip memory access request is not associated with any additional data of the second processor core; and prefetching only the third data based on the determination.

15. The method of claim 14, wherein determining that the third data associated with the second memory access request is not associated with the any additional data of the second processor core comprises:

determining that a stride entry does not exist for the memory access request; and generating the stride entry.

16. The method of claim 15, wherein determining that the third data associated with the second memory access request is not associated with the any additional data of the second processor core further comprises determining that a group does not exist for the stride entry.

17. The method of claim 15, wherein determining that the third data associated with the second off-chip memory access request is not associated with the any additional data of the second processor core comprises determining that a confidence threshold, corresponding to a confidence level that the third data is associated with the any additional data, is less than a threshold level.

18. The method of claim 17, further comprising updating the confidence threshold based on the determining that the confidence threshold is less than the threshold level.

* * * * *